United States Patent [19]

Wynn et al.

[11] Patent Number: 4,641,490
[45] Date of Patent: Feb. 10, 1987

[54] HEADER HEIGHT/LATERAL FLOAT CONTROL FOR COMBINE HEADER

[75] Inventors: Edward J. Wynn, Leola; Glenn A. Musser; Lawrence M. Halls, both of New Holland, all of Pa.

[73] Assignee: New Holland Inc., New Holland, Pa.

[21] Appl. No.: 722,585

[22] Filed: Apr. 12, 1985

[51] Int. Cl.[4] .............................................. A10D 75/28
[52] U.S. Cl. ..................................... 56/10.2; 56/208; 56/DIG. 15
[58] Field of Search ................ 56/10.2, 208, 209, 210, 56/DIG. 15

[56] References Cited

U.S. PATENT DOCUMENTS

| | | | |
|---|---|---|---|
| 3,309,852 | 3/1967 | Allen | 56/10.2 |
| 3,349,549 | 10/1967 | Van der Lely | 56/10.2 |
| 3,509,701 | 5/1970 | Clarke | 56/208 |
| 3,605,391 | 9/1971 | Schott et al. | 56/208 |
| 3,643,407 | 2/1972 | Hubbard et al. | 56/10.2 |
| 3,728,851 | 4/1973 | Van Antwerp | 56/208 |
| 3,908,345 | 9/1975 | Oni et al. | 56/208 |
| 4,099,555 | 3/1977 | Temple | 56/10.2 |
| 4,124,970 | 11/1978 | Bernhardt | 56/10.2 |
| 4,136,508 | 1/1979 | Coleman et al. | 56/10.2 |
| 4,171,606 | 10/1979 | Ziegler et al. | 56/10.2 |
| 4,193,250 | 3/1980 | Kessens et al. | 56/208 |
| 4,199,925 | 4/1980 | Quick et al. | 56/208 |
| 4,204,383 | 5/1980 | Milliken, Jr. | 56/10.2 |
| 4,206,584 | 6/1980 | Johnson et al. | 56/210 |
| 4,211,057 | 7/1980 | Dougherty et al. | 56/10.2 |
| 4,227,363 | 10/1980 | Kerber et al. | 56/10.2 |
| 4,229,931 | 10/1980 | Schlueter et al. | 56/10.2 |
| 4,253,295 | 3/1981 | Knepper | 56/209 |
| 4,409,778 | 10/1983 | McNaught | 56/10.2 |

OTHER PUBLICATIONS

"An Automatic Pickup Header Height Controller for Combine Harvesters", by Kerley et al, ASAE Paper No. 81-1605, Dec. 1981.

Primary Examiner—Gene Mancene
Assistant Examiner—David L. Tarnoff
Attorney, Agent, or Firm—Larry W. Miller; Frank A. Seemar; Darrell F. Marquette

[57] ABSTRACT

A header height/lateral float control mechanism for a crop harvesting header mounted on a combine base unit for movement in a generally vertical direction and for rotational movement in a generally vertical plane to permit the header to follow changes in the ground contour is disclosed wherein a height sensor bar is rotatably supported along substantially the entire transverse width of the header and first and second tilt sensors are mounted adjacent the transversely spaced header sidewalls. The control mechanism is operatively associated with the tilt sensors and the height sensor such that the header lift mechanism is operated whenever the height sensor is actuated and the mechanism for rotatably tilting the header can be actuated only when the tilt sensors indicate different relative ground changes. The control mechanism further includes electrically actuated switches that are interconnected to prevent actuation of the header tilt mechanism whenever both tilt sensors register identical ground contour changes.

13 Claims, 14 Drawing Figures

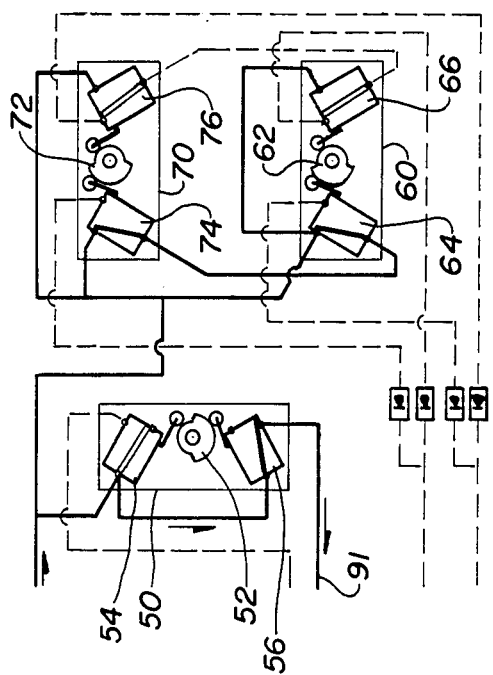
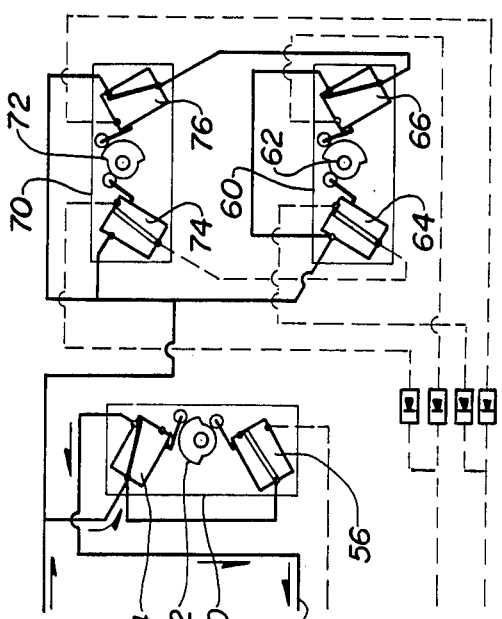
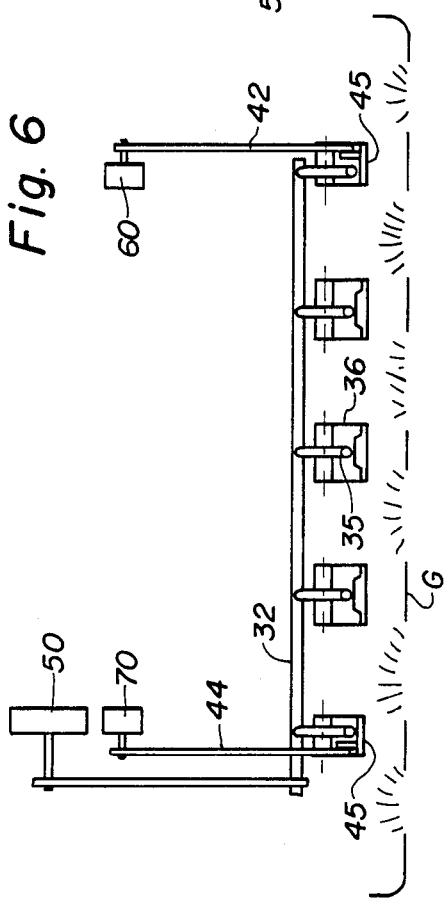
Fig. 6
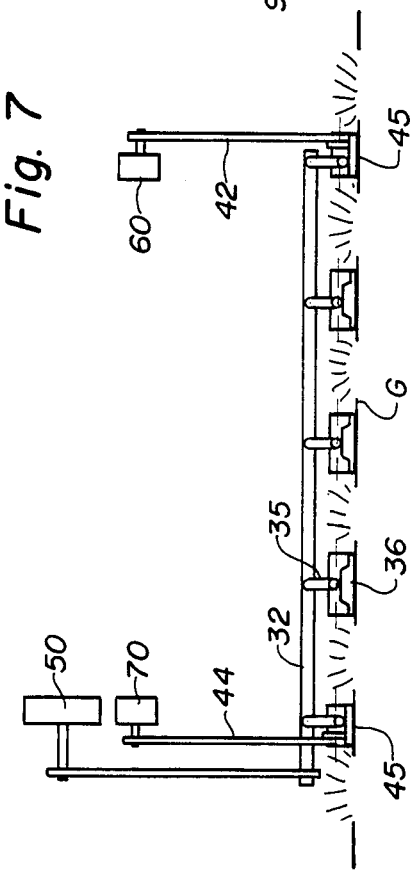
Fig. 7

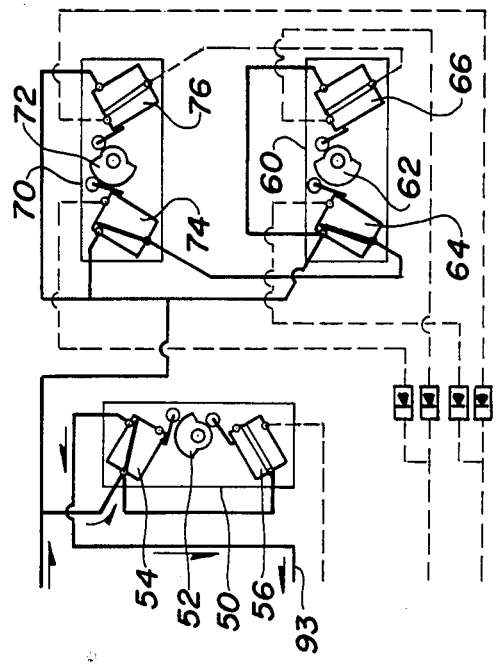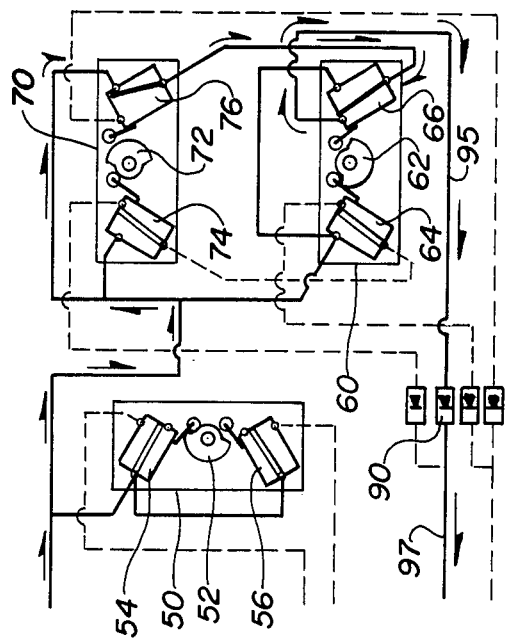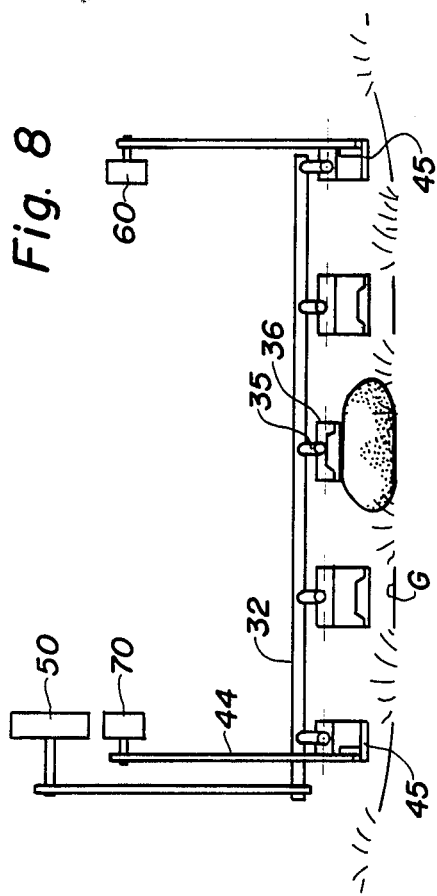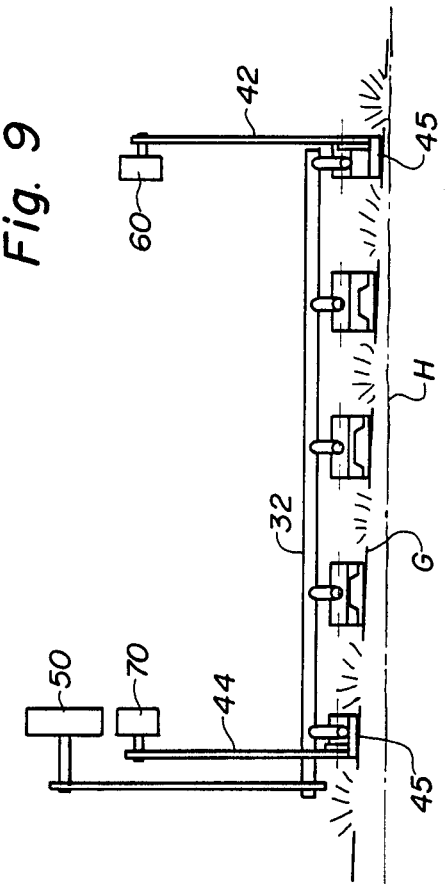

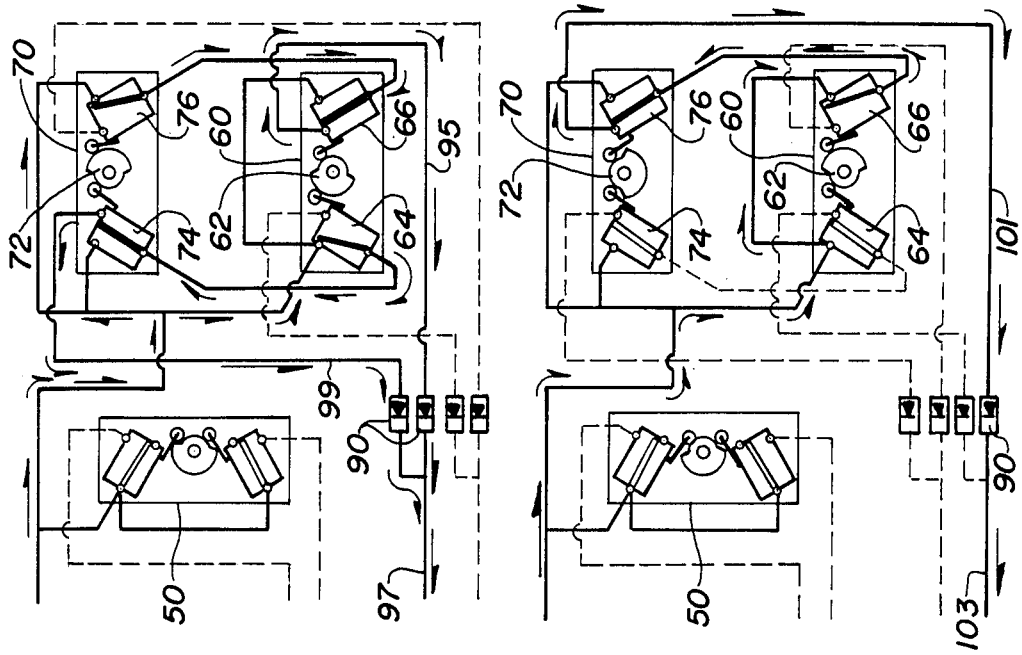
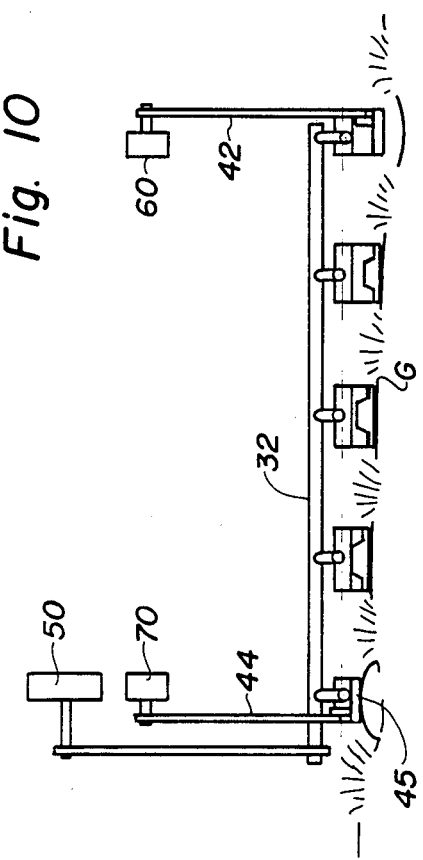
Fig. 10
Fig. 11

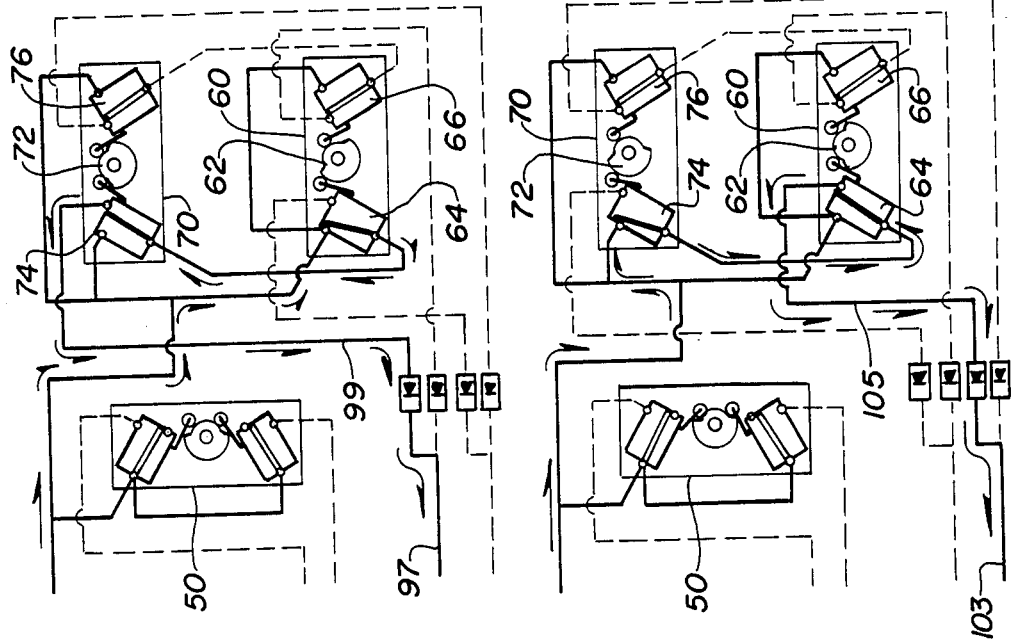
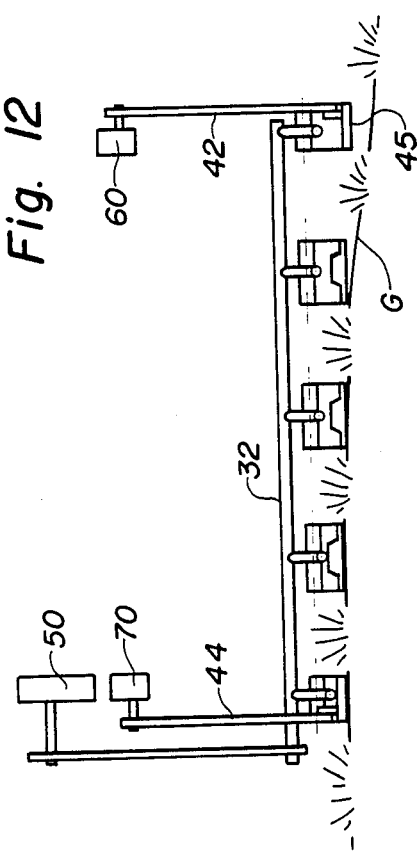
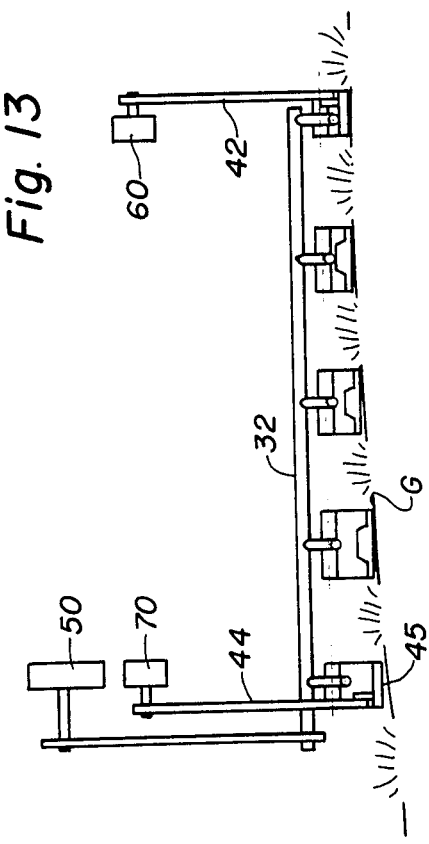

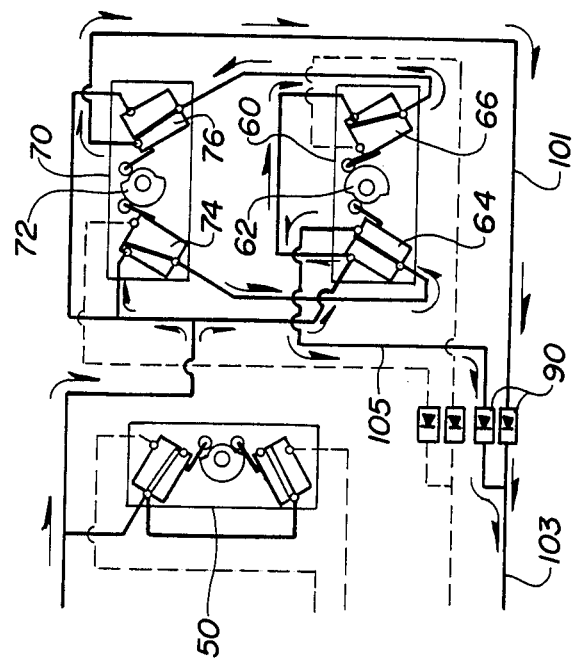
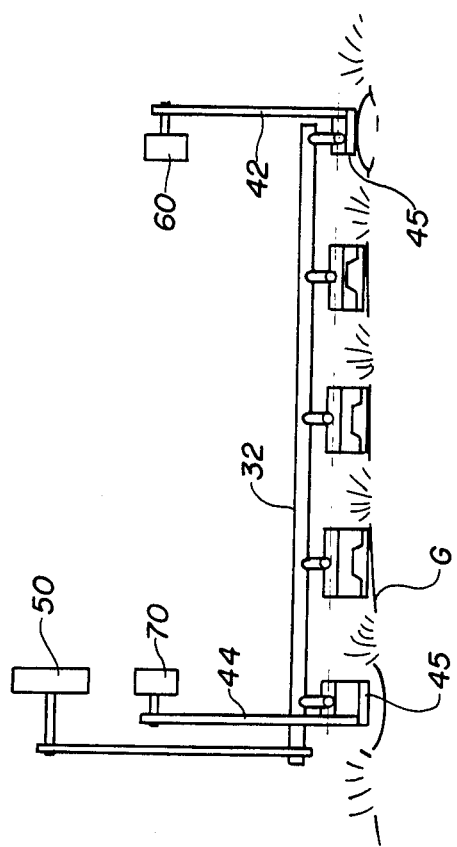
Fig. 14

HEADER HEIGHT/LATERAL FLOAT CONTROL FOR COMBINE HEADER

BACKGROUND OF THE INVENTION

The present invention relates generally to crop harvesting headers attachable to a combine to initiate the crop harvesting process and, more particularly, to a control mechanism for operably controlling the lifting and tilting of the header relative to the combine in response to the sensing of the ground relative to the header to permit the header to follow changing ground contours.

For some crops, such as soybeans, it is necessary to keep the cutterbar of the crop harvesting header as close to the ground as possible without permitting the cutterbar to impact into the ground. The lateral float attachment mechanism for combine headers described in U.S. Pat. No. 4,253,295, granted to Larimer J. Knepper on Mar. 3, 1981, provides the capability for the combine header to be pivotally rotated about a centrally located pivot axis. The provision of a tilt cylinder between the header cradle assembly and the feederhouse provides the capability of rotatably moving the header during harvesting operation thereof.

A combination of the operation of the header lift cylinders operably interconnecting the combine frame and the header to provide a generally vertical movement of the header with the operation of the header tilt cylinder to provide a lateral floating movement permits the combine header to closely follow changing ground contours to maximize the efficiency of the harvesting operation for crops in which it is necessary for the header to closely follow the ground. It would be desirable then to provide a control mechanism to automatically control the operation of the header lift and tilt cylinders so that the combine header will follow change in ground contours without the need for operator input.

SUMMARY OF THE INVENTION

It is an object of this invention to overcome the aforementioned disadvantages of the prior art by providing a control mechanism for a combine header mounted for both header height and lateral float movements to permit the combine header to follow changing ground contours relative to the combine base unit.

It is another object of this invention to provide a control mechanism to permit the combine header to automatically follow the changing ground contours without the need for operator input.

It is still another object of this invention to provide a ground sensing mechanism having a header height sensor bar spanning substantially the entire transverse width of the header and individual tilt sensors mounted adjacent each respective transverse sidewall of the combine header.

It is a feature of this invention to provide a header height/lateral float control mechanism for a combine header in which the header height control has priority over the lateral float control.

It is another feature of this invention that each ground sensor has at least one finger projecting outwardly therefrom to affect a rotation of the respective sensor in response to a movement of the ground relative to thereto.

It is an advantage of this invention that the control mechanism includes a cam member associated with each ground sensor to be movable in response to the rotation of the corresponding sensor to activate switches to control the operation of the header lift and tilt cylinders.

It is still another feature of this invention that the header height sensor is actuated by the highest ground contour along the entire transverse width of the header.

It is another advantage of this invention that the cam members for each of the tilt and header height sensor are located in individual locations proximate to the respective sensor.

It is still another advantage of this invention that the control mechanisms associated with each respective sensor are interconnected by an electrical circuit.

It is a further object of this invention to provide a control mechanism that cancels the signals received from the tilt sensors when the tilt sensors register identical ground changes.

It is yet another feature of this invention that the switches corresponding to the cam members for the individual ground sensors are electrically interconnected to give priority to the header height sensor and cancel signals generated whenever the tilt sensors indicate identical ground contour changes.

It is yet a further object of this invention to provide a header height/lateral float control mechanism for controlling the attitude of a crop harvesting header which is durable in construction, inexpensive of manufacture, carefree of maintenance, facile in assemblage and simple and effective in use.

These and other objects, features and advantages are accomplished according to the instant invention by providing a header height/lateral float control mechanism for a crop harvesting header mounted on a combine base unit for movement in a generally vertical direction and for rotational movement in a generally vertical plane to permit the header to follow changes in the ground contour wherein a height sensor bar is rotatably supported along substantially the entire transverse width of the header and first and second tilt sensors are mounted adjacent the transversely spaced header sidewalls. The control mechanism is operatively associated with the tilt sensors and the height sensor such that the header lift mechanism is operated whenever the height sensor is actuated and the mechanism for rotatably tilting the header can be actuated only when the tilt sensors indicate different relative ground changes. The control mechanism further includes electrically actuated switches that are interconnected to prevent actuation of the header tilt mechanism whenever both tilt sensors register identical ground contour changes.

BRIEF DESCRIPTION OF THE DRAWINGS

The advantages of this invention will become apparent upon consideration of the following detailed disclosure of the invention, especially when taken in conjunction with the accompanying drawings wherein:

FIG. 6 is a diagramatic view of the crop sensing mechanism and a flow diagram for a portion of the electrical circuit under conditions where the ground is lowing relative to the header;

FIG. 7 is a diagramatic view of the crop sensing mechanism and a flow diagram for a portion of the electrical circuit under conditions where the ground is rising relative to the header;

FIG. 8 is a diagramatic view of the crop sensing mechanism and a flow diagram for a portion of the electrical circuit under conditions where the header height sensor indicates a raising of the ground surface while the tilt sensors indicate the ground is lowering relative to the header;

FIG. 9 is a diagramatic view of the crop sensing mechanism and a flow diagram for a portion of the electrical circuit under conditions where the right tilt sensor indicates the ground is rising relative to the header while the left tilt sensor and the header height sensor do not register any change;

FIG. 10 is a diagramatic view of the crop sensing mechanism and a flow diagram for a portion of the electrical circuit under conditions where the right tilt sensor indicates the ground is rising relative to the header while the left tilt sensor indicates the ground is falling and the height sensor registers no change;

FIG. 11 is a diagramatic view of the crop sensing mechanism and a flow diagram for a portion of the electrical circuit under conditions where the right tilt sensor and the height sensor register no change while the left tilt sensor indicates the ground is rising;

FIG. 12 is a diagramatic view of the crop sensing mechanism and a flow diagram for a portion of the electrical circuit under conditions where the right tilt sensor and the height sensor indicate no change while the left tilt sensor indicates the ground is falling;

FIG. 13 is a diagramatic view of the crop sensing mechanism and a flow diagram for a portion of the electrical circuit under conditions where the right tilt sensor indicates the ground is falling and the left tilt sensor and height sensor indicate no change; and FIG. 14 is a diagramatic view of the crop sensing mechanism and a flow diagram for a portion of the electrical circuit under conditions where the right tilt sensor indicates the ground is falling while the left tilt sensor indicates the ground is raising and the height sensor registers no change.

DETAILED DESCRIPTION OF THE PREFERRED EMBODIMENT

Figure 1:
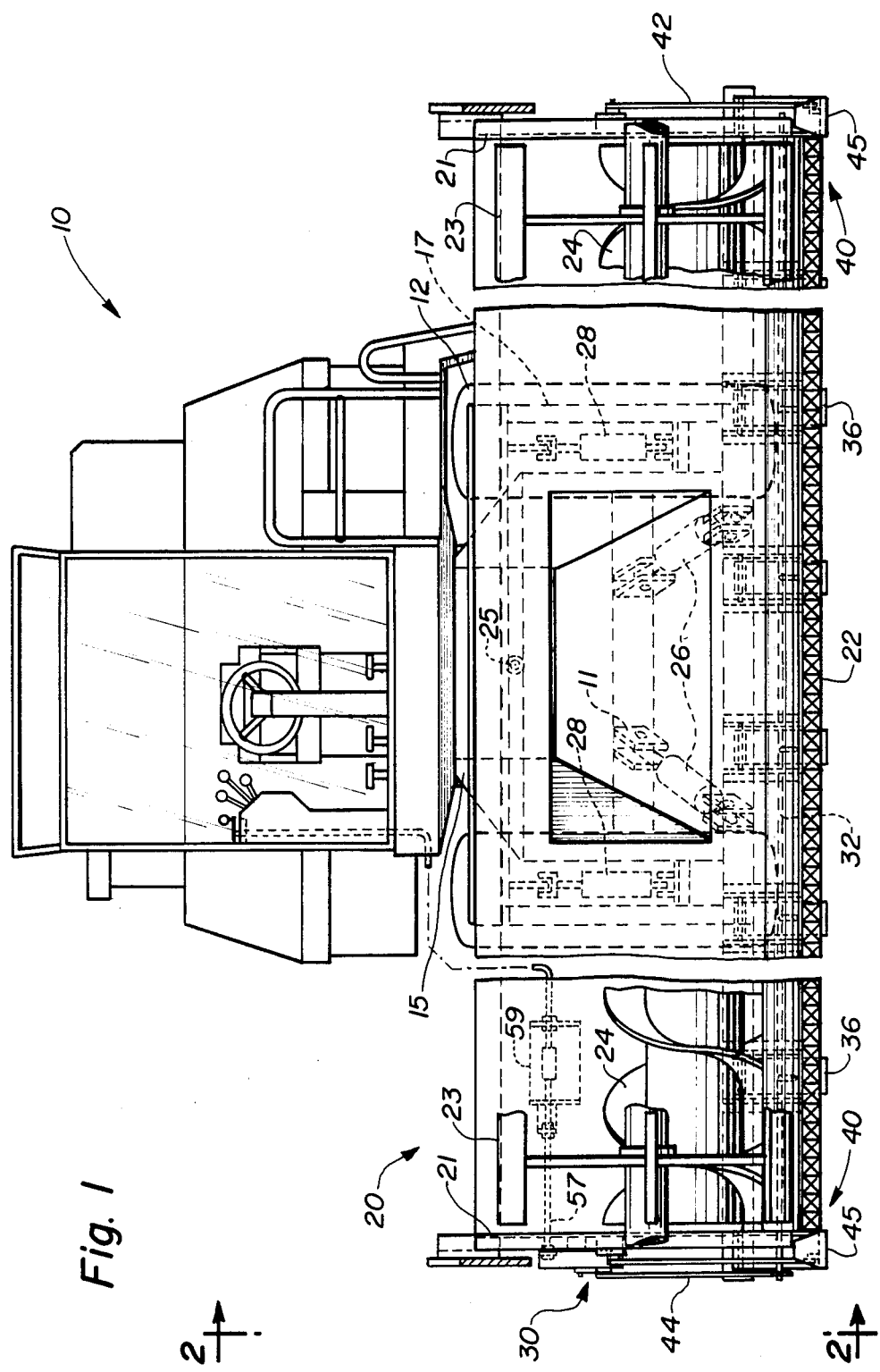
FIG. 1 is a front elevational view of a combine harvester having a crop harvesting header mounted thereon and incorporating the principles of the instant invention.
Figure 2:
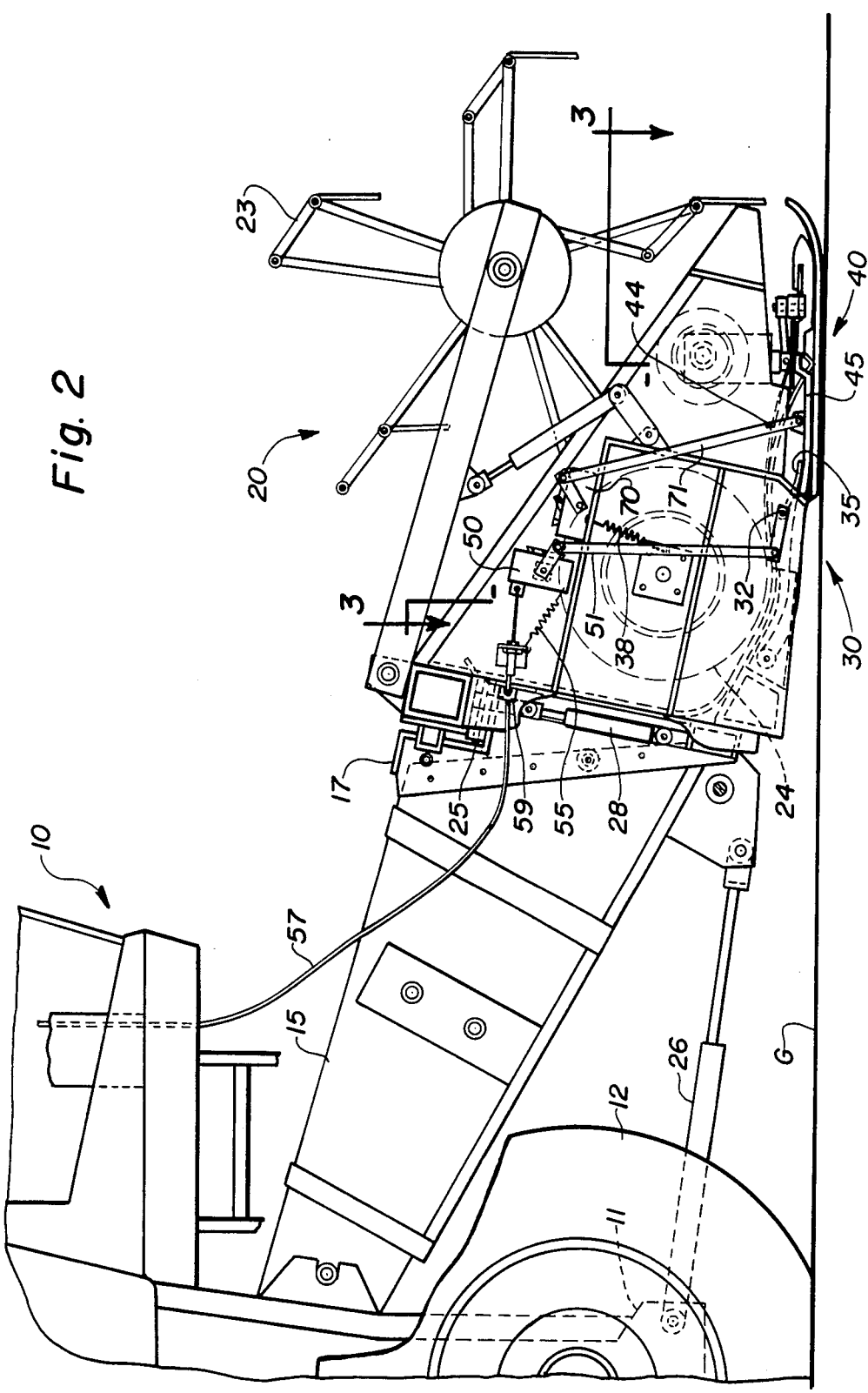
FIG. 2 is a partial side elevational view of the combine harvester seen in FIG. 1 corresponding to lines 2—2 and showing the right side of the crop harvesting header.
Figure 3:
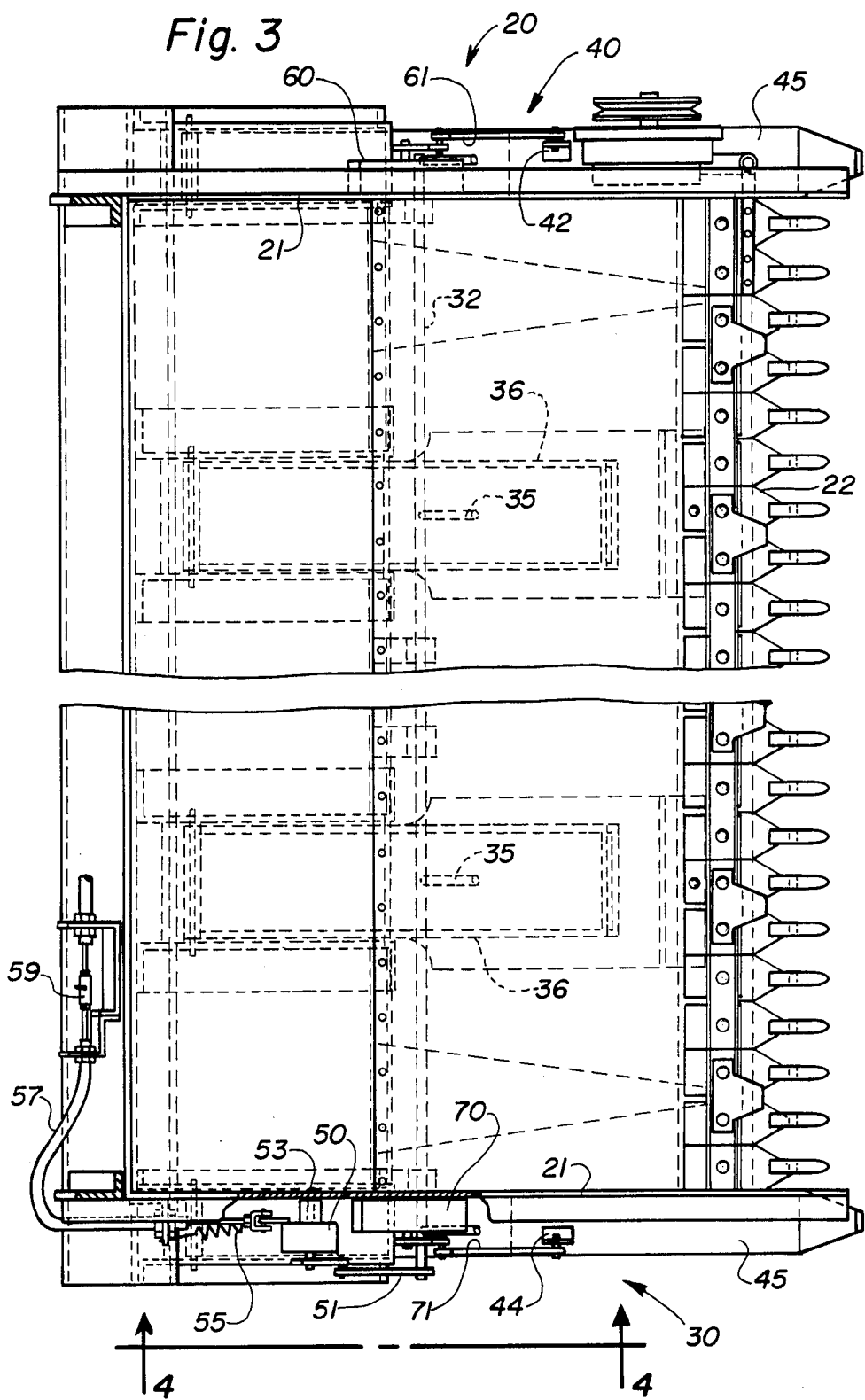
FIG. 3 is a fragmentary cross-sectional view of the header corresponding to lines 3—3 of FIG. 2, portions of the header being broken out to shorten the view.
Figure 4:
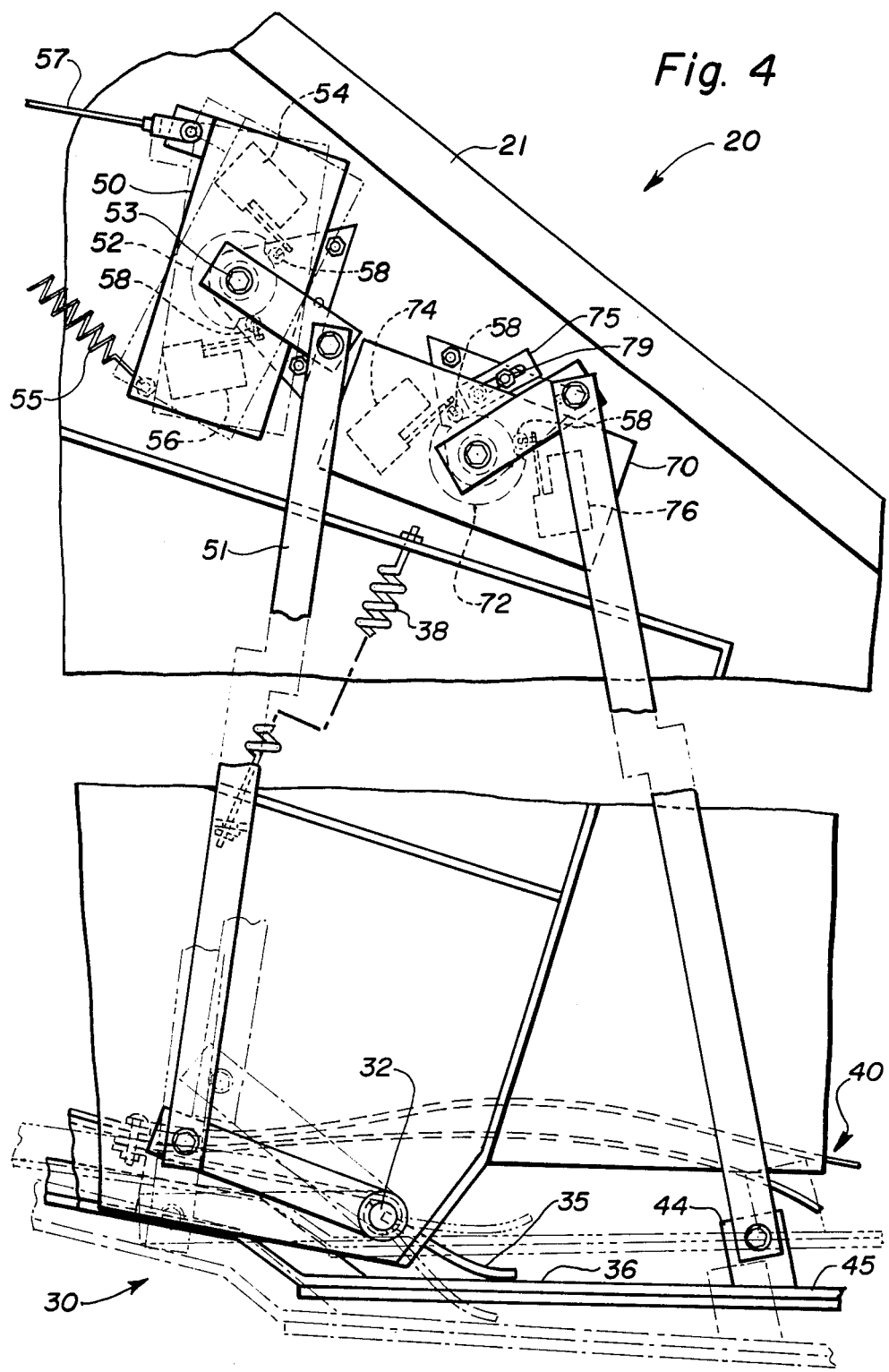
FIG. 4 is an enlarged partial right side elevational view of the header corresponding to lines 4—4 of FIG. 3, portions of the header being broken out to shorten the view.

Referring now to the drawings and, particularly, to FIG. 1, a front elevational view of the combine having a crop harvesting header attached thereto can be seen. Any left and right references are used as a matter of convenience and are determined by standing at the rear of the machine, facing the forward end, the direction of travel. The combine base unit 10 is of generally conventional construction with a main frame 11 supporting ground engaging wheels 12 to mobilely support the combine 10 over the ground G. As best seen in FIGS. 1 and 2, the combine 10 is provided with a feederhouse 15 projecting forwardly therefrom. As is described in greater detail in U.S. Pat. No. 4,253,295, granted to Larimer J. Knepper on Mar. 3, 1981, the description of which is incorporated herein by reference, the feederhouse 15 is provided with a cradle assembly 17 to pivotally support the crop harvesting header 20 in a forwardly extending crop engaging position to initiate the crop harvesting process.

The drawings depict a flexible crop harvesting header 20 which is described in greater detail in U.S. Pat. No. 4,414,793, to L. M. Halls on Nov.15, 1983, the description of which is incorporated herein by reference, including a transversely extending cutterbar 22, a reel 23 to engage the standing crop material and sweep it rearwardly over the cutterbar 22, and an auger 24 to consolidate the harvested crop material and convey it rearwardly into the feederhouse 15.

The header 20 is supported by the cradle assembly 17 for rotational movement in a generally vertical plane about the fore-and-aft extending pivot axis 25. A pair of tranversely spaced hydraulic lift cylinders 26 interconnecting the combine frame 11 and the feederhouse 15 provides a source of power to vertically lift the header 20 relative to the ground G. A hydraulic tilt cylinder 28 disposed between the feederhouse 15 and the cradle assembly 17 provides a source of power for rotating the header about the pivot axis 25 to provide a lateral floating movement to the header 20. It should be noted that a single double acting cylinder 28 could be provided to pivotally rotate the header 20; however, it is preferable to provide a pair of transversely spaced tilt cylinders 28 on opposite sides of the pivot axis 25 to provide this rotational movement.

Referring now to FIGS. 1-4, the ground sensing mechanism 30 can best be seen. The height sensor bar 32 is rotatably mounted perpendicular to the direction of travel and extends substantially the entire transverse width of the header 20 between opposing sidesheets 21. Sensor bar 32 is provided with a plurality of fingers 35 rigidly affixed to the bar 32 and extending outwardly therefrom for engagement with a corresponding ground engaging shoe 36. The fingers 35 are biased toward engagement with the corresponding ground engaging shoe 36 by a spring 38 such that movements of the ground engaging shoes 36 affects a rotation of the sensor bar 32 to correspond therewith. Because the fingers 35 are rigidly affixed to the bar 32, the sensor bar 32 is actuated by the highest point of the ground engaged by the ground engaging shoes 36 along the entire transverse width of the header.

The tilt sensing mechanism 40 includes a left tilt sensor 42 and a right tilt sensor 44 connected to the outermost ground engaging member 45 along the corresponding sidesheet 21 of the header 20. Each tilt sensor 42,44 is connected directly to a control mechanism as will be described in greater detail below. The outermost ground engaging member 45 can be a ground engaging shoe 36 similar to that transversely spaced along the width of the header intermediate the opposing sidesheets 21 or the outermost ground engaging member 45 could be the divider point of the header 20 or if other similar construction depending upon the construction of the header 20.

The header height sensor bar 32 is connected to a control box 50 by a linkage 51. A cam member 52 is rotatably mounted within the control box 50 for rotation with the sensor bar 32 as provided by the connecting linkage 51. A pair of switches 54,56 having cam followers 58 engageable with the cam member 52 are mounted within the control box 50 to register the rotation of the cam member 52. As will be described in greater detail below, a rotation of the sensor bar 32 will cause an actuation of one of the switches 54,56 depending upon the direction of movement of the corresponding fingers 35. For example, a raising of the ground G relative to the header 20 will cause a raising of the ground engaging shoes 36 and a corresponding upward movement of the fingers 35 on the sensor bar 32. The resultant rotation of the sensor bar 32 pulls down on the linkage 51 and affects a rotation of the cam member 52 in a clockwise direction as viewed in FIG. 4 and a resulting actuation of switch 54 due to the cam follower 58 following the surface of the cam member 52; however, as can be readily realized from FIG. 4, the switch 56 will not be actuated under these circumstances.

Similarly, the left and right tilt sensors 42,44 have individual control boxes 60,70, respectively, in which are mounted rotatable cam members 62,72, respectively, connected to the corresponding outermost ground engaging member 45 by a linkage 61,71, respectively. A movement of the outermost ground engaging member 45 effects a rotation of the corresponding cam member 62,72 to effect an actuation of one of a pair of switches 64,66 and 74,76, respectively, in the similar manner described above relative to the header height sensor.

To permit an adjustment of the relative position between the ground G and the header 20 at which the lift cylinders 25 are actuated, the control box 50 is pivotally mounted to the header sidesheet 21 and biased for rotation about the pivot axis 53 by the spring 55. The rotated position of the control box 50 is controlled by the cable 57 which extends through a disconnect 59 to the cab of the combine 10 to permit header height adjustment on the go. One skilled in the art will readily realize that pivotal movement of the control box 50 as controlled by the cable 57 will move the position of the switches 54,56 relative to the cam member 52 to vary the amount of rotation of the cam member 52 needed to actuate the switches 54,56. For the same reasons, the tilt control boxes 60,70 are also pivotally adjustable through operation of a slider-crank mechanism 75 which is lockable in a selected position by a bolt 79.

Figure 5:
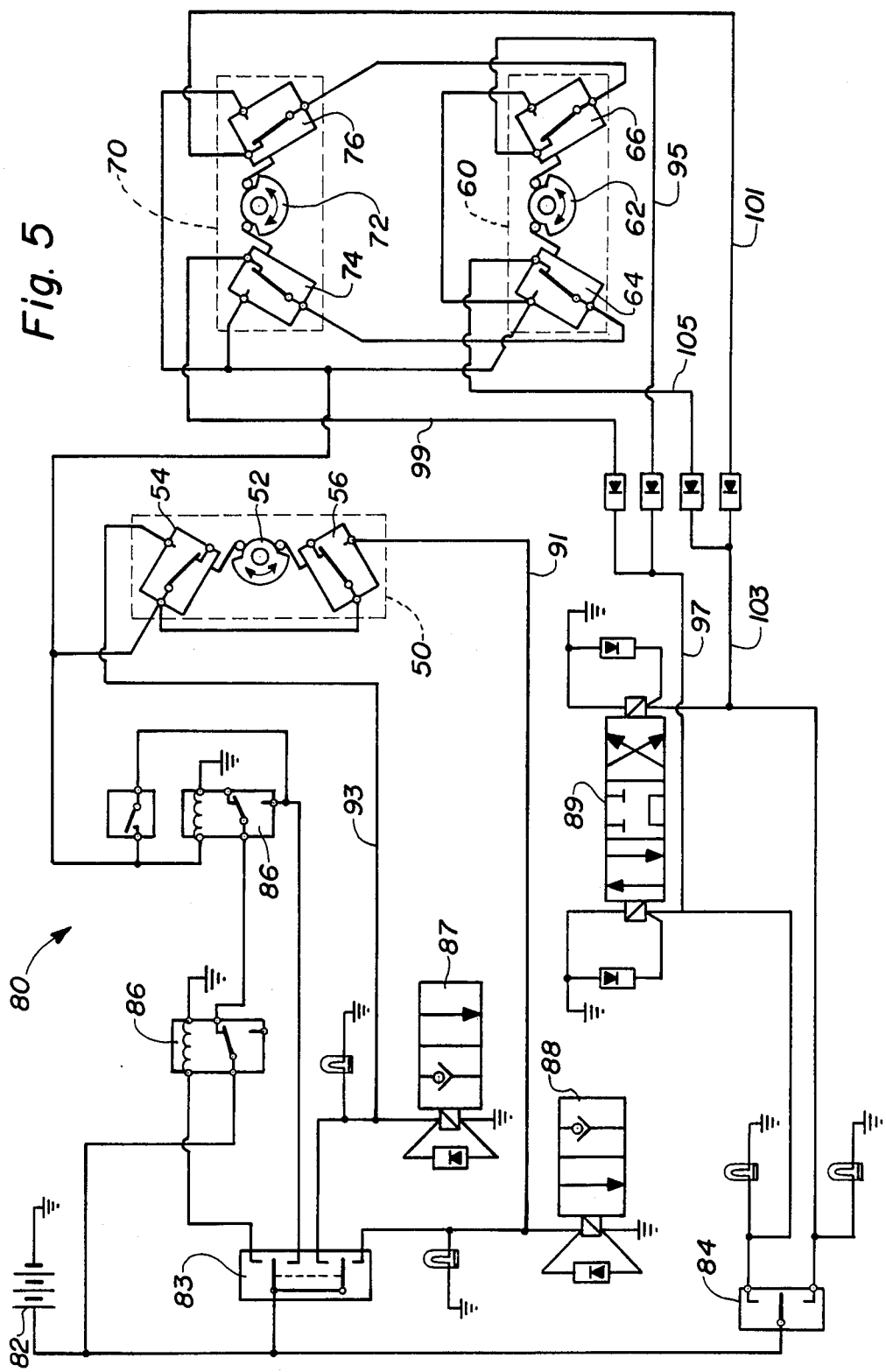
FIG. 5 is a schematic diagram of the electrical circuit forming the control mechanism for controlling the header height and lateral float of the crop harvesting header.

Referring now to the electrical circuit diagram shown in FIG. 5, it can be seen that the switches 54,56,64,66,74,76 are electrically interconnected in such a manner as to place priority to the header height control and the header tilt control mechanism in parallel circuits and yet permit an actuation of the header tilt mechanism only when the left and right tilt sensors 42,44 register different ground sensing readings. The electrical circuit 80 includes a battery 82 serving as a source of electrical current, a manual header height control switch 83 and a manual tilt control switch 84. After passing through approximate relays 86, electrical current is introduced first to the header height control box 50 and then to the tilt control boxes 60,70. Current exiting the height control box 50 can pass to either a solenoid valve 87 for affecting a raising of the header or a solenoid valve 88 for affecting a lowering of the header. Electrical current exiting one tilt control box 60 or 70 flows to the other tilt control box 60 or 70 and then ultimately to a solenoid tilt valve 89 for controlling the lateral flotational movement of the header 20. The solenoid valves 87,88,89 control the flow of hydraulic fluid under pressure within a conventional hydraulic circuit to the header lift cylinders 26 and tilt cylinders 28, respectively.

Referring now to the FIGS. 6-14, the operation of the electrical circuit to control the header height/lateral float movements of the header 20 can readily be seen. Referring first to FIG. 6, it can be seen that rotation of the sensor bar 32 has rotated the cam member 52 to actuate the switch 56. Electrical current flows first to switch 54 and then on to switch 56, and through switch 56 and finally flows through wire 91 to activate the solenoid valve 88 to affect a lowering of the header 20. Electrical current also passes into both tilt control boxes 60 and 70 and since the cam members 62,72 have been rotated to actuate switches 64,74, the flow path of the current as indicated by the solid lines passes through the switches 64,74 and terminates at the opposing switches 66,76 without passing on to the solenoid tilt valve 89. Since both tilt sensors 42,44 register the same ground location, the signals generated from the two tilt sensors 42,44 cancel each other out and permit the header 20 to be lowered without being tilted.

Referring now to FIG. 7, the sensor bar 32 has affected a rotation of the cam member 52 to actuate switch 54 within the control box 50 due to the raising of the ground G relative to the header 20. Electrical current entering switch 54 passes through switch 54 and on through wire 93 to activate the solenoid valve 87 to affect a raising of the header 20. As shown by the solid lines, the flow path of electrical current terminates at switch 56 and on to the control box 60,70, through switches 66,76 to terminate at switches 64,74 without flowing on to the solenoid tilt valve 89. As noted with respect to FIG. 6, since the tilt sensors 42,44 register the same relative ground movement, the tilt mechanism is not actuated and the net result is that the header 20 is raised without tilting the header 20.

In FIG. 8, the sensor bar 32 registers a ground height abnormality intermediate the sidesheets 21, shown in the form of a large rock, while both left and right tilt sensors 42,44 register a falling ground contour. As noted with respect to FIG. 7 above, the current flows through switch 54 and on through wire 93 to the raise valve 87. Electrical current flowing through switches 64 and 74 within the control boxes 60,70 eventually terminate in switches 66 and 76 in the same manner as described above relative to FIG. 6. As a result, the header is raised without registering any actuation of the tilt mechanism since both tilt sensors 42,44 register the same relative ground movement.

In FIGS. 9-14, the height sensor is not rotated sufficiently to actuate either switch 54 or switch 56 and, as a result, the electrical current terminates at switch 56 without flowing on to either solenoid valve 87 or 88, respectively. In FIG. 9, the slope of the ground G is referenced by the horizontal plane H, which is sensed by the right sensor 44 indicating a rising ground level. As a result, the flow of electrical current is indicated by the solid lines and passes through switch 76 and on to switch 66 and then through wire 95 and wire 97 after passing through a diode 90 to actuate the solenoid tilt valve 89 to effect a counterclockwise rotation of the header 20.

FIG. 10 depicts an actuation of the tilt sensors 42,44 in opposing directions, resulting in switch 76 and switch 64 being actuated. The flow of electrical current is depicted by the solid lines through control boxes 60 and 70 and onward through lines 95 and 99 which, after passing through diodes 90 to prevent the backflow of electrical current merge into line 97 to affect a counterclockwise rotation of the header 20.

Referring to FIG. 11, only the left sensor 42 has been activated to actuate switch 66. The flow of electrical current, as indicated by the solid lines, passes through switch 66 and on to switch 76 and outwardly from control box 70 to wire 101 and through a diode 90 into wire 103 to the solenoid tilt valve 89, thereby effecting a clockwise rotation of the header 20.

In FIG. 12, the left tilt sensor 42 has actuated switch 64 which sends a flow of current, as indicated by the solid lines, through switch 64 and on through switch 74, through wire 99 and wire 97 to activate the solenoid valve 89 and affect a counterclockwise rotation of the header 20.

As seen in FIG. 13, the right sensor 44 has actuated switch 74 resulting in the flow of current as indicated by the solid lines through switch 74 then on through switch 64, through wire 105 and wire 103 to the solenoid valve 89 to affect a clockwise rotation of the header 20.

FIG. 14 depicts an opposite actuation of tilt sensors 42,44 such that switches 66 and 74 are actuated. As indicated by the solid lines, the flow of current goes through all four switches 64,66,74 and 76 to flow through wires 104 and 105 before merging into wire 103, with diodes 90 maintaining a proper direction for the flow of electrical current, and passing to the solenoid valve 89 to affect a clockwise rotation of the header 20.

It will be readily understood by one skilled in the art upon a reading of this disclosure that the switches corresponding to the two tilt sensors 42,44 are electrically interconnected such that current must pass through at least one switch of each respective pair of switches before the current can flow to the solenoid valve 89 for operatively controlling the header tilt cylinders 28. In this manner, the signals generated by the respective tilt sensors 42,44 can cancel each other when the respective tilt sensors 42,44 indicate identical ground contour changes, thereby permitting the header lift cylinders 26 to raise or lower the header 20. Current flowing to the pair of switches 54,56 corresponding to the header height sensor 32 does not flow to any of the tilt switches 64,66,74,76 before passing on to the header lift valves 87,88.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a combine harvester having a mobile frame adapted for movement over the ground; a transversely extending crop harvesting header supported from said frame for movement in a generally vertical direction to permit said header to follow changing ground elevation and for a transverse tilting movement to permit said header to follow changes in transverse ground slope; header lift means operatively associated with said header to move said header in said generally vertical direction relative to said frame; header tilt means operatively associated with said header to transversely tilt said header relative to said frame; sensor means supported by said header to sense changes in ground elevation and ground slope; and control means operatively interconnecting said sensor means and said header lift means and said header tilt means for actuation of said header lift means and said header tilt means to effect respective movement of said header in response to the sensing of changes in ground elevation and slope, the improvement comprising:

a height sensor including a sensor rotatably supported substantially between transversely spaced header sidewalls, said sensor bar having a plurality of fingers affixed thereto and projecting outwardly therefrom for engagement with a corresponding number of ground engaging members pivotally supported by said header, the rotation of said sensor bar being controlled by the highest of said ground engaging shoes;

first and second tilt sensors mounted, respectively, on the ground engaging members adjacent said header sidewalls for movement therewith; and said control means including a rotatable cam member operably connected to each of said sensors such that movement of each said sensor effects a rotation of the corresponding said cam member, the cam members associated with said first and second tilt sensors and said height sensors being operatively associated with first, second and third pairs of switches, respectively, each one of said switches being actuated upon a rotation of the corresponding said cam member in a predetermined direction beyond a neutral position, said switches being interconnected so that said header lift means is actuated whenever said height sensor rotates the corresponding said cam member out of said neutral position and that said header tilt means is actuated only when at least one of the cam members corresponding to said tilt sensors is rotated into a position that is different than the position of the other cam member corresponding to said tilt sensors.

2. The combine harvester of claim 1 wherein said control means further includes electrical solenoid valves controlling the flow of hydraulic fluid to hydraulically powered header lift means and header tilt means, said switches controlling the flow of electrical current from a primary source to said electrical solenoid valves.

3. The combine harvester of claim 2 wherein said first and second pairs of switches, corresponding to the tilt sensor cam members, are connected in series such that electrical current must pass through both pairs of switches before reaching the electrical solenoid valve for said header tilt means.

4. The combine harvester of claim 3 wherein the first switch of each of said first and second pairs of switches is actuated whenever the corresponding said tilt sensor senses a lowering of the ground relative to the respective end of said header, said second switch of each of said first and second pairs of switches being actuated whenever the corresponding said tilt sensor senses a raising of the ground relative to said header, said electrical solenoid valve for said header tilt means receiving electrical current from said first and second pairs of switches when different corresponding switches of said first and second pairs of switches have been actuated.

5. The combine harvester of claim 4 wherein electrical current cannot flow to the electrical solenoid valve for said header tilt means when the cam members corresponding to said first and second tilt sensors are both in the neutral position.

6. The combine harvester of claim 2 wherein electrical current passing through said third pair of switches, corresponding to said height sensor, flows to the electrical solenoid valve for said header lift means without passing through said first and second pairs of switches.

7. The combine harvester of claim 6 wherein said control means includes a pair of electrical solenoid valves for controlling the raise and lower movements of said header lift means, said third pair of switches controlling the flow of electrical current to both said header lift solenoid valves.

8. A mechanism for controlling the movements of a crop harvesting header mounted on a harvesting machine to permit said header to follow changes in ground contour, said header being operably associated with a header lift means for powering a generally vertically movement relative to said harvesting machine and with a header tilt means for powering a transverse tilting movement of said header relative to said harvesting machine, comprising:

a height sensor having a sensor bar rotatably mounted on said header and extending between transversely spaced ends of said header, said sensor bar having a plurality of fingers movable with the changes in ground contour relative to the header to cause rotation of said sensor bar;

first and second tilt sensors connected to the ground engaging members adjacent the transverse ends of said header, respectively, said tilt sensors being movable with the corresponding ground engaging member with changes in the ground contour relative to said header; and control means operably interconnecting said sensors and said header lift means and said header tilt means to actuate said header lift means and said header tilt means in response to the sensing of changes in ground contour relative to said header by said sensors, said first and second tilt sensors being connected in series such that said header tilt means is not actuated unless said first and second tilt sensors are in different positions.

9. The mechanism of claim 8 wherein said control means includes first, second and third rotatable cam members corresponding, respectively, to said first and second tilt sensors and said height sensor, said cam members and the corresponding said sensors being interconnected such that the movements of said sensors effect a corresponding rotation of said cam members, each said cam member being engageable with a corresponding pair of switches, each said switch being actuated upon the rotation of the corresponding cam member in a preselected direction from a neutral position.

10. The mechanism of claim 9 wherein said header lift means and said header tilt means are hydraulically operated, said control mechanism further including electrical solenoid valves for controlling the flow of hydraulic fluid to said header lift means and said header tilt means, said switches controlling the flow of electrical current to said solenoid valves.

11. The mechanism of claim 10 wherein said first and second pairs of switches, corresponding to said first and second tilt sensors, are connected in series such that said header tilt means is not actuated unless said first and second cam members are in different positions.

12. The mechanism of claim 11 wherein electrical current passing through said third pair of switches flows to the solenoid valve for said header lift means without passing through said first and second pairs of switches.

13. The mechanism of claim 12 wherein said fingers are ridgedly affixed to said sensor bar and control the rotation of said sensor bar from the highest of said ground engaging members.

* * * * *